United States Patent
Dropps et al.

(10) Patent No.: US 7,411,958 B2
(45) Date of Patent: Aug. 12, 2008

(54) METHOD AND SYSTEM FOR TRANSFERRING DATA DIRECTLY BETWEEN STORAGE DEVICES IN A STORAGE AREA NETWORK

(75) Inventors: Frank R. Dropps, Maple Grove, MN (US); Kevin M. Wurzer, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 554 days.

(21) Appl. No.: 10/956,717

(22) Filed: Oct. 1, 2004

(65) Prior Publication Data

US 2006/0072580 A1    Apr. 6, 2006

(51) Int. Cl.
*H04L 12/28* (2006.01)

(52) U.S. Cl. .................. 370/392; 370/419; 710/100

(58) Field of Classification Search .................. None
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,980,857 A | 12/1990 | Walter et al. | |

(Continued)

FOREIGN PATENT DOCUMENTS

EP    0649098    9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Edan Orgad
*Assistant Examiner*—Jung Park
(74) *Attorney, Agent, or Firm*—Klein, O'Neill & Singh, LLP

(57) ABSTRACT

A method and system for performing a copy operation between storage devices coupled to a Fiber Channel switch element is provided. The Fiber Channel switch element receives a user command to copy data from a source storage device to a destination storage device and controls the copying operation. The Fiber Channel switch acts as a SCSI initiator and initiates a write operation for the destination storage device and initiates a read operation for the source storage device; and uses an alias cache for intercepting messages between the destination and source storage devices. A RX_ID mapping cache is used to substitute a RX_ID so that that a Fiber Channel write target appears to the source storage device as the destination storage device, and to the destination storage device a Fiber Channel read target appears to be the source storage device.

28 Claims, 8 Drawing Sheets

U.S. PATENT DOCUMENTS

| | | | |
|---|---|---|---|
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,260,935 A | 11/1993 | Turner | |
| 5,339,311 A | 8/1994 | Turner | |
| 5,367,520 A | 11/1994 | Cordell | 370/60 |
| 5,390,173 A | 2/1995 | Spinney et al. | |
| 5,537,400 A | 7/1996 | Diaz et al. | |
| 5,568,165 A | 10/1996 | Kimura | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,768,271 A | 6/1998 | Seid et al. | |
| 5,768,533 A | 6/1998 | Ran | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,134,127 A | 10/2000 | Kirchberg | |
| 6,144,668 A | 11/2000 | Bass et al. | |
| 6,151,644 A | 11/2000 | Wu | |
| 6,160,813 A | 12/2000 | Banks et al. | 370/422 |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,289,002 B1 | 9/2001 | Henson et al. | |
| 6,301,612 B1 | 10/2001 | Selitrennikoff et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,467,008 B1 | 10/2002 | Gentry, Jr. et al. | 710/261 |
| 6,470,026 B1 * | 10/2002 | Pearson et al. | 370/463 |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,606,690 B2 | 8/2003 | Padovano | |
| 6,614,796 B1 | 9/2003 | Black et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,779,083 B2 | 8/2004 | Ito et al. | |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |
| 6,934,799 B2 | 8/2005 | Acharya et al. | |
| 6,941,357 B2 | 9/2005 | Nguyen et al. | |
| 6,941,482 B2 | 9/2005 | Strong | |
| 6,947,393 B2 | 9/2005 | Hooper, III | |
| 6,952,659 B2 | 10/2005 | King et al. | |
| 6,968,463 B2 | 11/2005 | Pherson et al. | |
| 6,987,768 B1 | 1/2006 | Kojima et al. | |
| 6,988,130 B2 | 1/2006 | Blumenau et al. | |
| 6,988,149 B2 | 1/2006 | Odenwald | |
| 7,000,025 B1 | 2/2006 | Wilson | |
| 7,002,926 B1 | 2/2006 | Eneboe et al. | |
| 7,010,607 B1 | 3/2006 | Bunton | |
| 7,024,410 B2 | 4/2006 | Ito et al. | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,051,182 B2 | 5/2006 | Blumenau et al. | |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,120,728 B2 | 10/2006 | Krakirian et al. | |
| 7,123,306 B2 | 10/2006 | Goto et al. | |
| 7,124,169 B2 * | 10/2006 | Shimozono et al. | 709/211 |
| 7,151,778 B2 | 12/2006 | Zhu et al. | |
| 7,171,050 B2 | 1/2007 | Kim | |
| 7,185,062 B2 * | 2/2007 | Lolayekar et al. | 709/213 |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,200,610 B1 | 4/2007 | Prawdiuk et al. | |
| 7,215,680 B2 | 5/2007 | Mullendore et al. | |
| 7,221,650 B1 | 5/2007 | Cooper et al. | |
| 7,230,929 B2 | 6/2007 | Betker et al. | |
| 7,233,985 B2 | 6/2007 | Hahn et al. | |
| 7,245,613 B1 | 7/2007 | Winkles et al. | |
| 7,248,580 B2 | 7/2007 | George et al. | |
| 7,263,593 B2 | 8/2007 | Honda et al. | |

| | | |
|---|---|---|
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,352,740 B2 | 4/2008 | Hammons et al. |
| 2001/0011357 A1 | 8/2001 | Mori |
| 2001/0022823 A1 | 9/2001 | Renaud |
| 2001/0038628 A1 | 11/2001 | Ofek et al. ............... 370/392 |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schmke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0115355 A1 | 6/2003 | Cometto et al. |
| 2003/0117961 A1 | 6/2003 | Chuah et al. |
| 2003/0120743 A1 | 6/2003 | Coatney et al. |
| 2003/0126223 A1 | 7/2003 | Jenne et al. |
| 2003/0126242 A1 | 7/2003 | Chang |
| 2003/0137941 A1 | 7/2003 | Kaushik et al. |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0218986 A1 | 11/2003 | DeSanti et al. |
| 2003/0229808 A1 | 12/2003 | Heintz et al. |
| 2004/0013088 A1 | 1/2004 | Gregg |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0054866 A1 | 3/2004 | Blumenau et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1* | 5/2004 | Walter et al. ............... 370/386 |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ............... 370/463 |
| 2004/0151188 A1 | 8/2004 | Maveli et al. |
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0036763 A1 | 2/2005 | Kato et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0184711 A1 | 8/2006 | Pettey |
| 2006/0203725 A1 | 9/2006 | Paul et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

"Deliver Server-Free Backup", *Pathlight & Computer Associates*, Write Paper of Apr. 2000, Ithaca, New York, XP-002381153, 1-8.

Curtis, A. R., "Design Considerations for 10-Gbit Fibre Channel", Curtis A. Ridgeway, Distinguished I/O Architect, *Storage and Computing ASIC's Division, LSI Logic Corp.*

Malavalli, Kumar, "High Speed Fibre Channel Switching Fabric Services", *Proceedings of the SPIE, SPIE*, Bellingham, VA, USA vol. 1577., XP000562869, ISSN: 0277-786X, (Sep. 4, 1991),216-226.

Melhem, et al., "Minimizing Wavelength Conversions in WDM Path Establishment", *Computer Science Department, University of Pittsburgh*, Pittsburgh, PA 15260, (2001), 197-211.

Naik, D. , "Inside Windows Storage:Server Storage Technologies for WIndows 2000, Windows Server 2003 and Beyond", *Addison-Wesley*, US, Chapter 5, XP-002381152, (Jul. 15, 2003), 137-173.

Ridgeway, Curt , "0GFC-40GFC using 4-lane XAUI's", *LSI Logic Presentation—T11/03-069v0*.

Brown, Douglas W., "A State-Machine Synthesizer", *18th Design Automation Conference*, (1981),301-305.
Banks, David C., et al., "Link Trunking and Measuring Link Latency in Fibre Channel Fabric", U.S. Appl. No. 60/286,046, 1-52.
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Examination Report from the European Patent Office dated Oct. 12, 2007 for European Application No. 05 805 632.6".
Malavalli, et al., "Fibre Channel Framing and Signaling (FC-FS) REV 1.10", *NCITS working draft proposed American National Standard for Information Technology*, (Jan. 25, 2001).
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
"Office Action from USPTO dated Apr. 3, 2008 for U.S. Appl. No. 10/894,587".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".

\* cited by examiner

METHOD AND SYSTEM FOR TRANSFERRING DATA DIRECTLY BETWEEN STORAGE DEVICES IN A STORAGE AREA NETWORK

BACKGROUND

1. Field of the Invention

The present invention relates to storage area networks, and more particularly to transferring data between storage devices using a Fibre Channel switch.

2. Background of the Invention

Storage area networks ("SANs") are commonly used where plural memory storage devices are made available to various host computing systems. Data in a SAN is typically moved from plural host systems (that include computer systems, servers etc.) to a storage system through various controllers/adapters.

Host systems often communicate with storage systems via a host bus adapter ("HBA", may also be referred to as a "controller" and/or "adapter") using an interface, for example, the "PCI" bus interface.

FIG. 1A shows a block diagram with a host system 10 having a HBA 11 coupled to a Fibre Channel switch 12. Switch 12 is also coupled to storage system 14 and 20. Storage system 14 includes HBA 13 and is coupled to storage devices 15, 16 and 17. Storage system 20 with HBA 21 is coupled to storage devices 18 and 19. The term storage device in this context includes, disk, tape drives or any other media used for storing electronic information.

Host system 10 typically includes several functional components. These components may include a central processing unit (CPU), main memory, input/output ("I/O") devices (not shown), read only memory, and streaming storage devices (for example, tape drives).

Storage devices (for example, 15, 16, 17, 18 and 19) are coupled using the Small Computer Systems Interface ("SCSI") protocol and use the SCSI Fibre Channel Protocol ("SCSI FCP") to communicate with other devices/systems. Both the SCSI and SCSI FCP standard protocols are incorporated herein by reference in their entirety. SCSI FCP is a mapping protocol for applying SCSI command set to Fibre Channel.

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

In Fibre Channel, a path is established between two nodes where the path's primary task is to transport data from one point to another at high speed with low latency, performing only simple error detection in hardware.

Fibre Channel fabric devices include a node port or "N_Port" that manages fabric connections. The N_port establishes a connection to a fabric element (e.g., a switch) having a fabric port or "F_port". Fabric elements include the intelligence to handle routing, error detection, recovery, and similar management functions.

A Fibre Channel switch (for example, 12) is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch.

Fibre Channel switches use memory buffers to hold frames received and sent across a network. Associated with these buffers are credits, which are the number of frames that a buffer can hold per fabric port.

Fibre Channel storage devices using the SCSI FCP protocol typically use the client/server model. Typically, the client is a host system with an HBA (an "Initiator") such as a file server that issues a read or write command to a "Target". The Target may be a disk array that responds to the client request. Most storage devices such as disk drives or tape drives are SCSI target devices. Initiator devices (usually host bus adapters on server computers) start all IO operations.

In a storage area network, backing up data, or any operation where large amounts of data is sent from one storage device to another, usually involves a server (host 10) reading data from one storage device (for example, disk 18) to the server, then writing it to the destination storage device (for example, disk 15). This operation is slow and inefficient.

Therefore, there is a need for a system for efficiently transferring data between two storage devices.

SUMMARY OF THE PRESENT INVENTION

In one aspect of the present invention, a method for performing a copy operation between storage devices coupled to a Fibre Channel switch element is provided. The method includes, initiating a write operation with a destination target storage device, wherein the Fibre Channel switch initiates the write operation and sets a source address of a source storage device from where data is to be copied; receiving a response from the destination storage device wherein the response includes a D_ID for the source storage device; routing the response from the destination storage device to a switch processor; initiating a read command with the source storage device; and substituting a RX_ID in the response received from the destination storage device so that the source storage device receives an expected RX_ID.

In another aspect of the present invention, a method for performing a copy operation between storage devices coupled to a Fibre Channel switch element is provided. The method includes, receiving a user command to copy data from a source storage device to a destination storage device, wherein the Fibre Channel switch receives the user command and controls the copying operation such that the Fibre Channel switch appears to the source storage device as the destination storage device, and to the destination storage device the Fibre Channel switch appears to be the source storage device.

The Fibre Channel switch acts as a SCSI initiator and initiates a write operation for the destination storage device and initiates a read operation for the source storage device; and uses an alias cache for intercepting messages between the destination and source storage devices.

A RX_ID mapping cache is used to substitute a RX_ID so that that a Fibre Channel write target appears to the source storage device as the destination storage device, and to the destination storage device a Fibre Channel read target appears to be the source storage device.

In yet another aspect of the present invention, a SAN having at least a host system and plural storage devices functionally coupled to each other is provided. The SAN includes a Fibre Channel switch element that receives a user command to copy data from a source storage device to a destination storage device, wherein the Fibre Channel switch receives the user command and controls the copying operation such that the Fibre Channel switch appears to the source storage device as the destination storage device, and to the destination storage device the Fibre Channel switch appears to be the source storage device.

In yet another aspect of the present invention, a Fibre Channel switch element functionally coupled to a host system and plural storage devices is provided. The Fibre Channel switch element includes a switch software module that receives a user command to copy data from a source storage device to a destination storage device, wherein the Fibre Channel switch controls the copying operation such that the Fibre Channel switch appears to the source storage device as the destination storage device, and to the destination storage device the Fibre Channel switch appears to be the source storage device.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

Figure 1A:
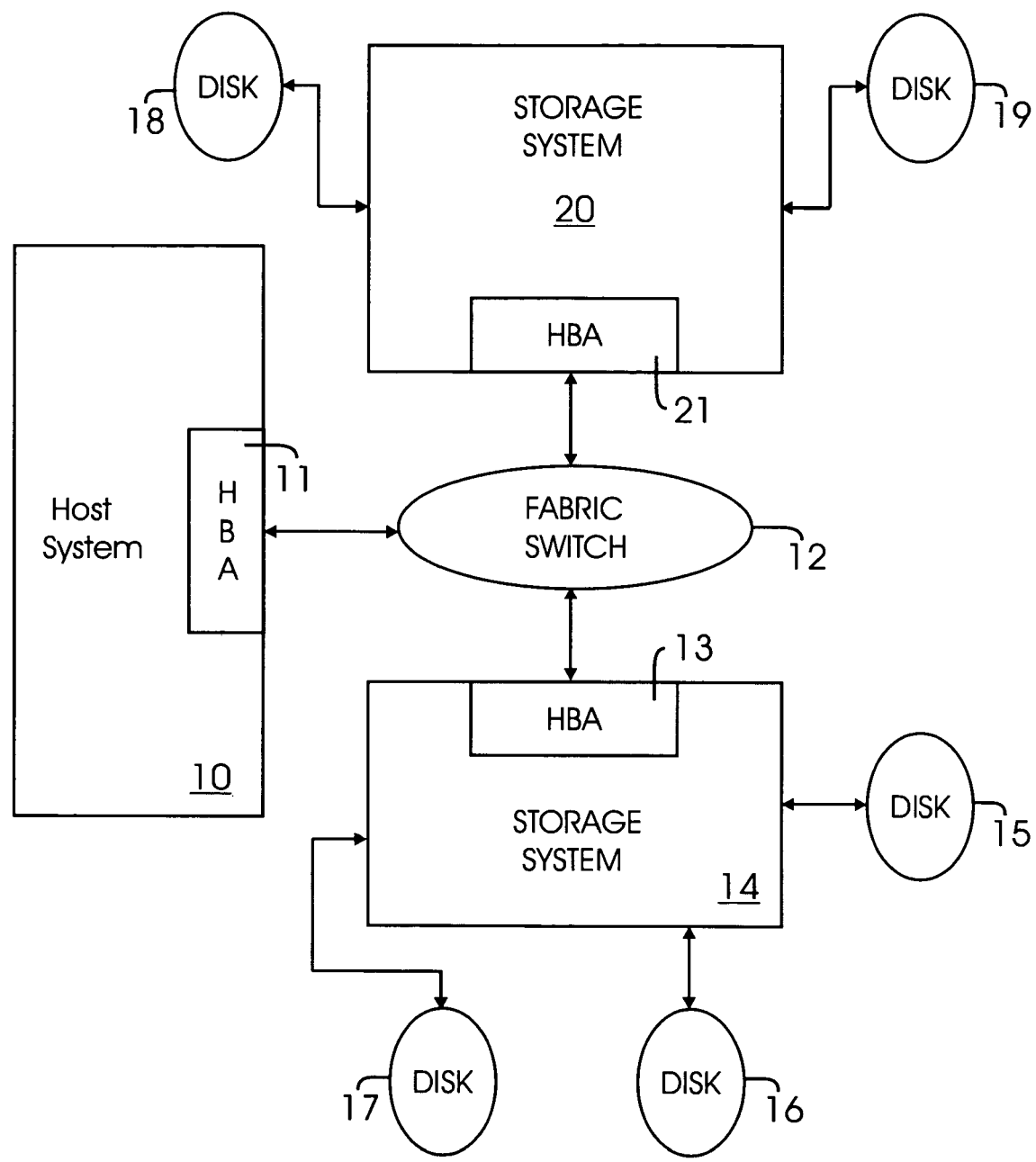
FIG. 1A shows an example of a Fibre Channel storage area network.

The following definitions are provided as they are typically (but not exclusively) used in the Fibre Channel environment, implementing the various adaptive aspects of the present invention.

"D_ID": A 24-bit Fibre Channel header field that contains the destination address for a frame.

"Exchange"—Operations for a SCSI data read or write. An exchange consists of three operational phases: command phase, data movement phase and response phase.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"Fabric Topology": This is a topology where a device is directly attached to a Fibre Channel fabric that uses destination identifiers embedded in frame headers to route frames through a Fibre Channel fabric to a desired destination.

"Initiator": A SCSI device that initiates an input/output ("IO") operation, for example, a HBA.

"L_Port": A port that contains Arbitrated Loop functions associated with the Arbitrated Loop topology.

"OX_ID": An Originator (i.e., a device/port that originates an exchange) Exchange identification field in a Fibre Channel frame header.

"N-Port": A direct fabric attached port, for example, a disk drive or a HBA.

"NL_Port": A L_Port that can perform the function of a N_Port.

"PLOGI": Standard Fibre Channel N_Port to N_Port login. PLOGI determines N_port to N_Port parameters and provides a specific set of operating parameters for communicating between N_ports. The port requesting PLOGI sends a PLOGI Extended Link Service Request addressed to the D_ID of an N_Port with which it needs to communicate. The addressed N_Port then returns an ACC (accept) reply. The request and reply contain operating parameters for communication between the N_Ports. The format for the request and reply are provided by the Fibre Channel standards.

"Port": A general reference to N. Sub.-Port or F.Sub.-Port.

"PRLI": Fibre Channel process log-in used by SCSI devices to establish a SCSI connection.

"RX_ID": A responder (i.e., a device/port that responds) exchange identification field in a Fibre Channel frame header.

"SAN": Storage Area Network

"SCSI FCP": A standard protocol, incorporated herein by reference in its entirety for implementing SCSI on a Fibre Channel SAN.

"S_ID": A 24-bit field in a Fibre Channel frame header that contains the source address for a frame.

"Switch": A fabric element conforming to the Fibre Channel Switch standards.

"Target": A SCSI device that accepts IO operations from Initiators, for example, storage devices such as disks and tape drives.

Switch Element

To facilitate an understanding of the preferred embodiment, the general architecture and operation of a Fibre Channel switch element will be described. The specific architecture and operation of the preferred embodiment will then be described with reference to the general architecture of the Fibre Channel switch element.

Figure 1B:
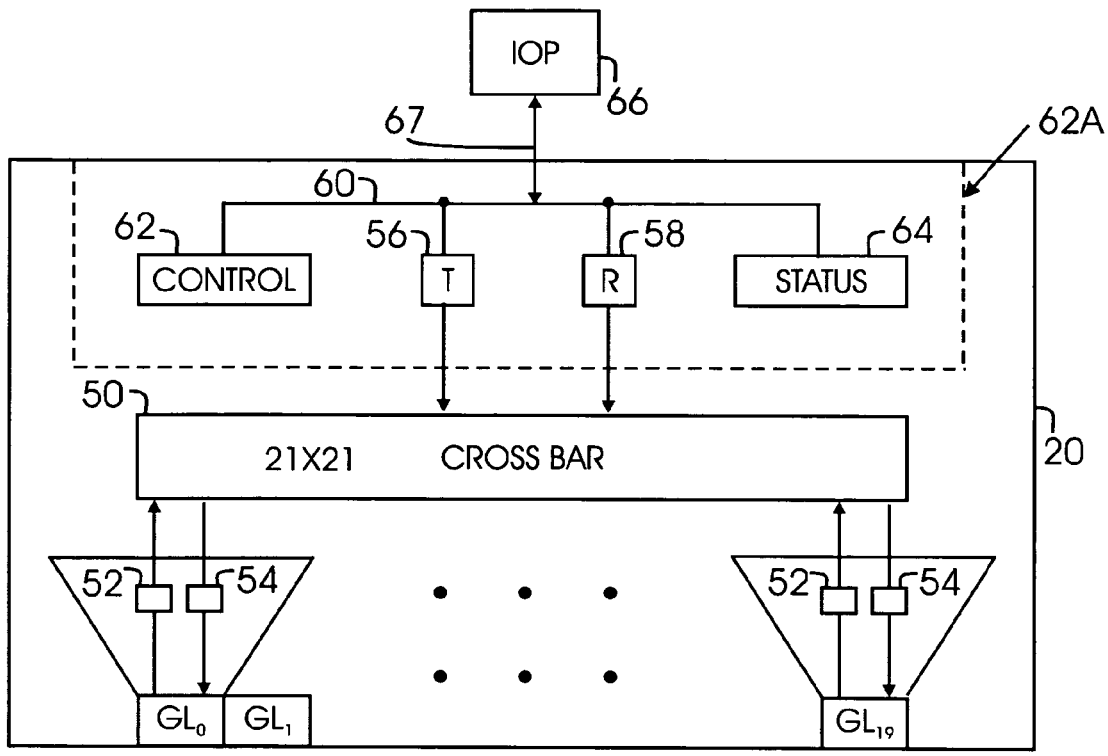
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
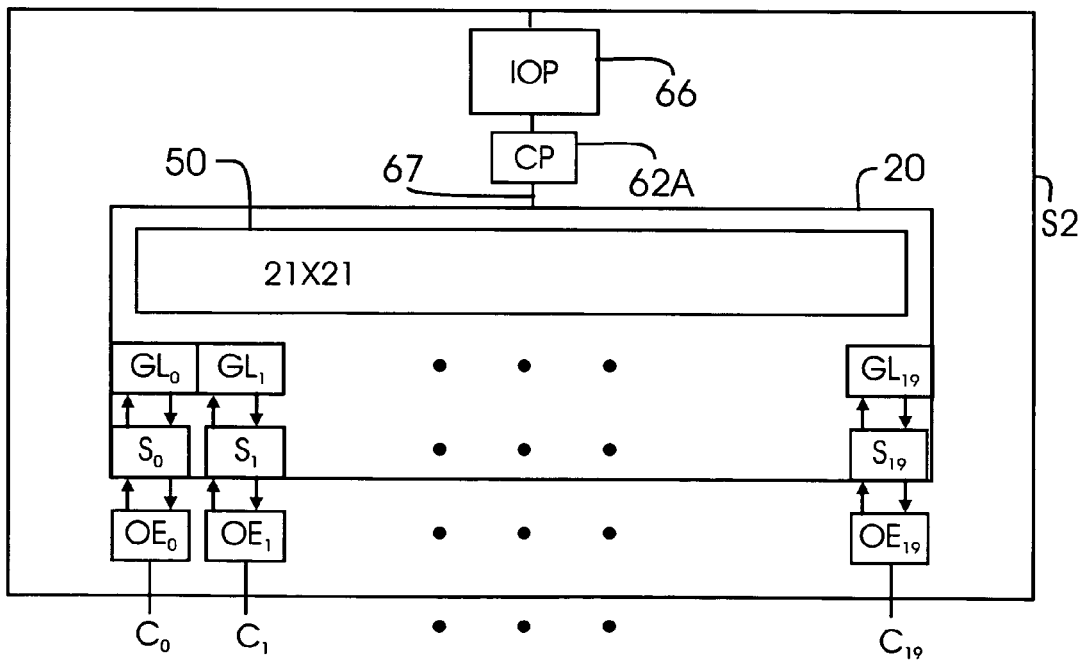
FIG. 1C shows a block diagram of a 20-channel switch chassis, according to one aspect of the present invention.

In the preferred embodiments of switch chassis described herein, the fabric controller is a firmware-programmed microprocessor, also referred to as the input/output processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
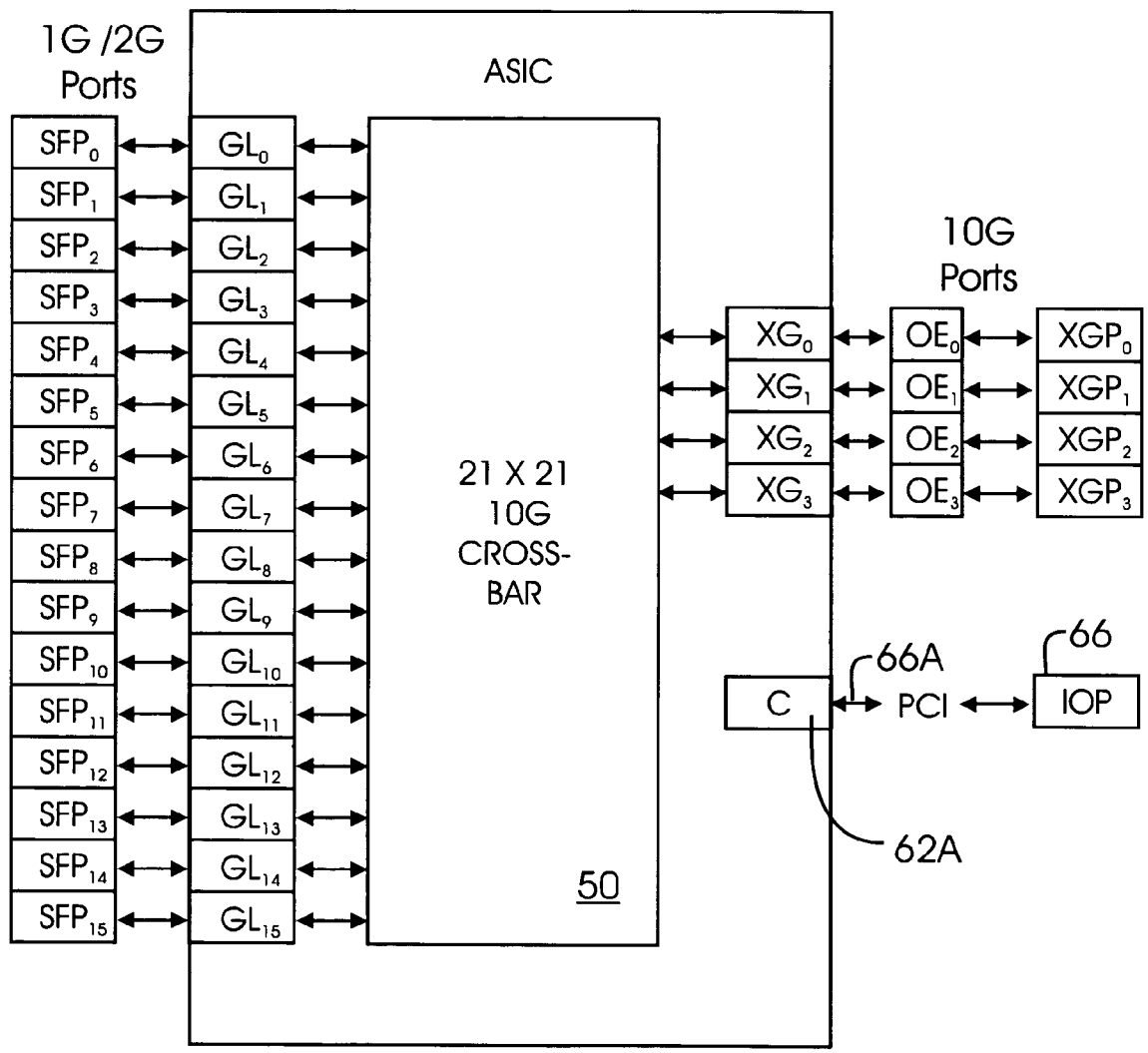
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

In one aspect of the present invention, a Fibre Channel switch initiates the Fibre Channel SCSI commands to read data from a source storage device and writes data to a destination storage device. To the source device, the switch appears to be the destination device, and to the destination device, the switch appears to be the source.

Data frames are routed directly from the source storage device to the destination by the switch. Control frames are intercepted by the switch and then processed as if the switch is a SCSI FCP initiator.

Figure 1E:
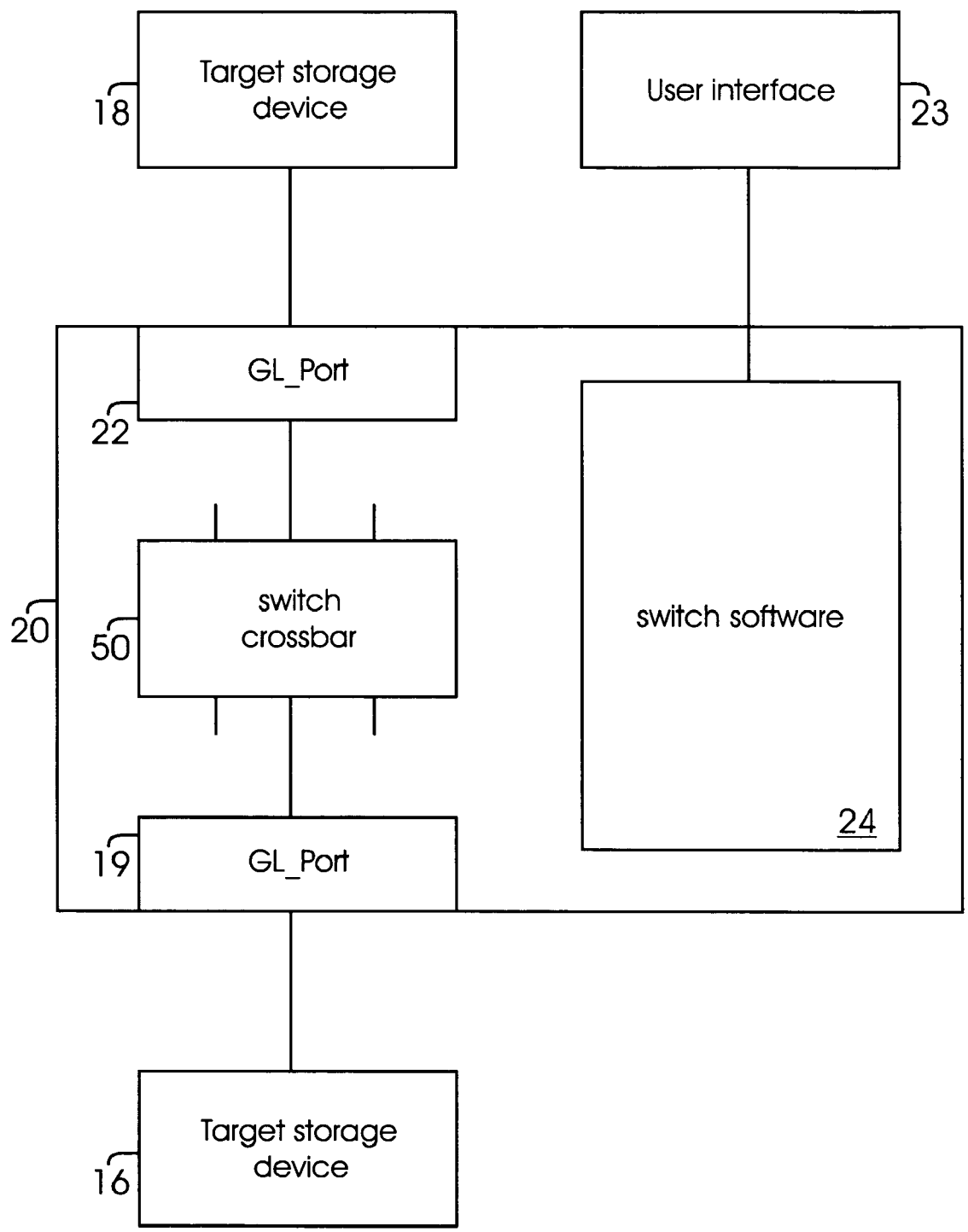
FIG. 1E shows a block diagram of a switch configuration where data is copied using a Fibre Channel switch, according to one aspect of the present invention.

FIG. 1E shows an example of a system that allows a Fibre Channel switch element 20 to control and facilitate data copying between storage devices. ASIC 20 has F_Ports 22 and 19 that are coupled to storage devices 18 and 16, respectively. A user interface 23 is provided that is functionally coupled to the switch software/firmware 24, which is a part of a switch management software program (not shown).

Software module 24 receives user commands via user interface 23 to perform back up or to perform a copy operation. The user commands include source (i.e., the storage device from where data is to be copied, for example, device 18) device information; and destination device (i.e. the device where the data is to be copied, for example, device 16) information.

Once the user commands are received, ASIC 20 takes control of the copying operation. ASIC 20 sends a write command to the destination device, for example, 16 and a read command to the source device, for example, 18. The addresses in the commands will appear to come from the storage devices but will actually come from ASIC 20.

Figure 1F:
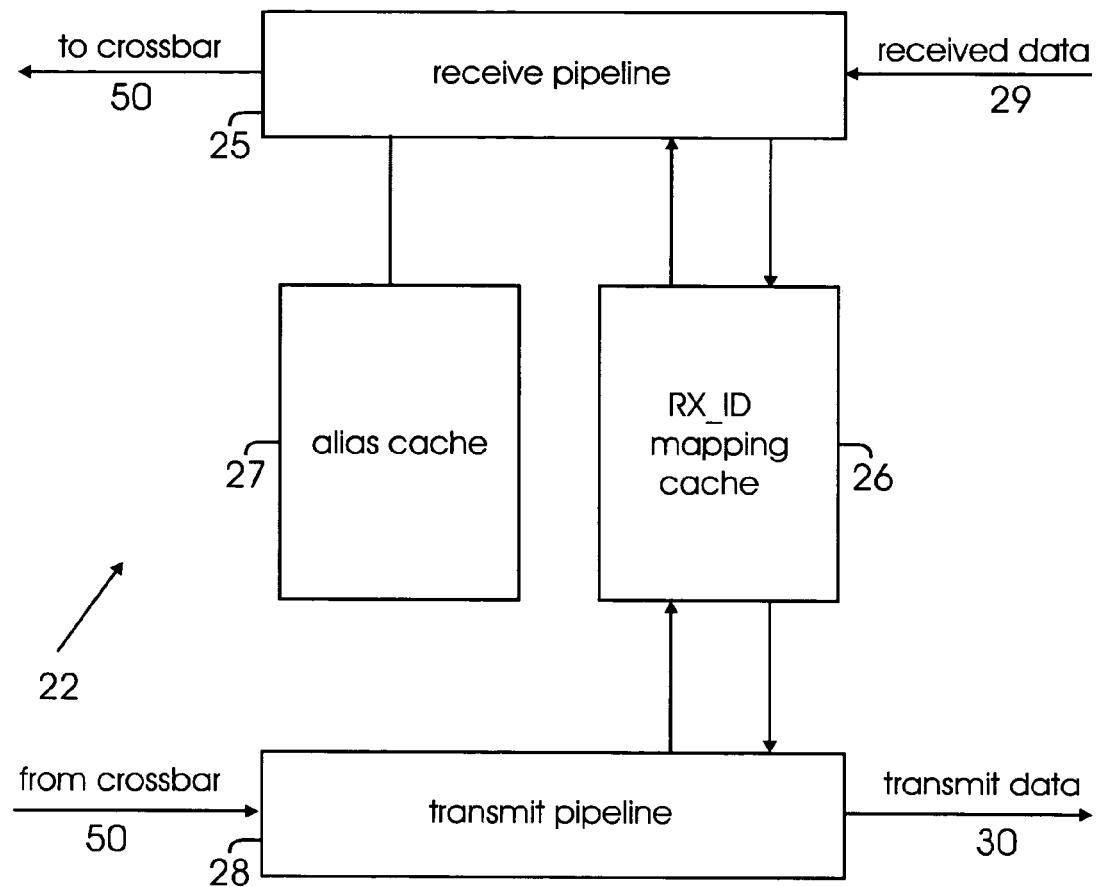
FIG. 1F shows a block diagram of a switch port used for controlling a copy operation, according to one aspect of the present invention.

FIG. 1F shows an example of a port 22, according to one aspect of the present invention. Port 22 includes a receive pipeline that receives Fibre Channel frames/data 29. Received data 29 is processed and then via crossbar 50 moves to the transmit pipeline 28. The transmit pipeline 28 transmits data 30 to the destination. Details of the pipelines and how frames are transmitted using alias cache 27 are provided in the patent application Ser. No. 10/894,546, filed on Jul. 20, 2004, the disclosure of which is incorporated herein by reference in its entirety.

Alias Cache 27 is used to intercept control frames from the source device 18 and destination 16 of the copy operation and routes the frame to switch software 24. Other functionality of Alias Cache 27 has been described in the aforementioned patent application.

Port 22 also includes a RX_ID Mapping cache 26 that substitutes the RX_ID on frames being received or transmitted by port 22. In one aspect of the present invention, in response to a copy operation where data is moved from device 18 to deice 16, RX_ID mapping cache 26 substitutes the RX_ID provided by device 16 with the RX_ID provided by device 18. Without this substitution, device 16 will see a different RX_ID from the one it expects and the exchange may fail because of a protocol error. RX_ID mapping cache 22 is described below in detail with respect to FIG. 2.

If an exception condition occurs, for example, if a target device has timed out, then IOP 66 firmware processes the exception condition.

Figure 3:
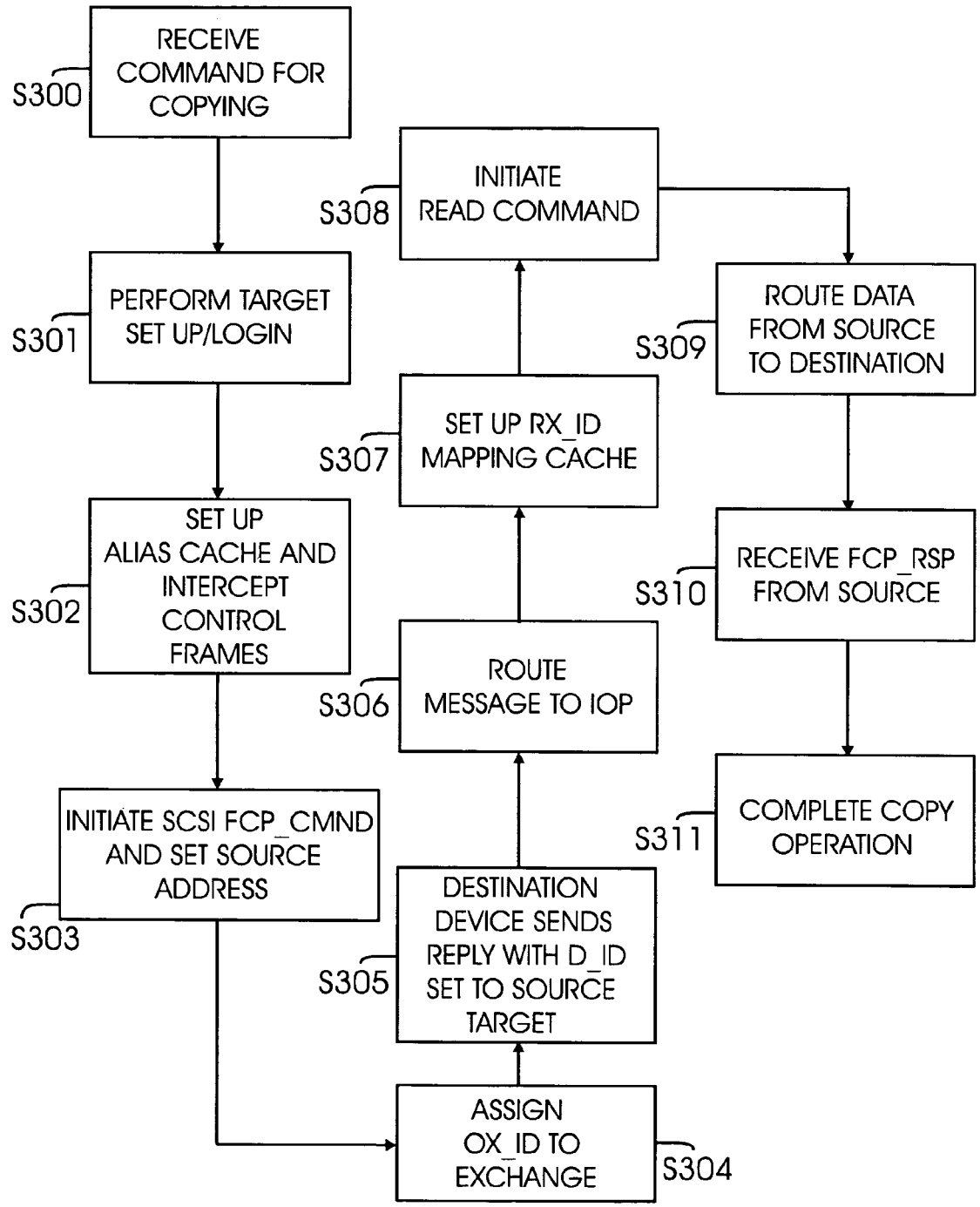
FIG. 3 is a flow diagram for switch controlled copy operation, according to one aspect of the present invention.

Switch Controlled Copy Operation:

FIG. 3 shows a process flow diagram for executing a copy operation controlled by switch 20.

Turning in detail to FIG. 3, in step S300, user commands for a copy/back up operation are received via user interface 23. In this example, data is to be copied from device 18 to device 16. In step S301, switch software module 24 performs set-up/log in operations for device 16. Switch 20 sends PLOGI frames to devices 18 and 16 and if successful, sends PRLI frames to devices 18 and 16 and then waits for a reply. It is noteworthy that the switch 20 logs into a target (for example, 18), rather than the target logging into switch 20.

If the set-up/log-in is successful, in step S302, switch 24 sets up alias cache 27 to intercept frames from device 18 and 16 and re-route them to IOP 66 (that controls the operation of switch software 24). Alias cache 27 is setup in both ports (i.e. ports 22 and 19) connecting to devices 18 and 16. It is noteworthy that steps S301 and S302 may occur simultaneously to avoid delay in executing the copy operation. Also, although alias cache 27 is setup to intercept the frames, any other component may be used to act as a filter for the frames.

In step S303, switch 20 using software 24 initiates a SCSI write operation with destination 16 using the SCSI FCP_C-MND message. The source address is set to that of device 18. In step S304, switch 20 also assigns an OX_ID to the exchange.

In step S305, device 16 sends a SCSI FCP_XFER_RDY message in reply to the command sent by switch 20 in step S303. The message from device 16 includes a D_ID that is set for device 18 (the source device) and the RX_ID that is also assigned by device 16.

In step S306, switch software 24 routes the message received from device 16 to IOP 66 and in step S307, switch software 24 sets' up RX_ID mapping cache 26 in port 22 that receives frames from device 18.

In step S308, switch software 24 initiates a SCSI read command with device 18 using a SCSI FCP_CMND message. The source address of the message is set to the N_Port address of device 16.

In step S309, data is routed directly from device 18 to device 16. Data itself is not intercepted by Alias cache 27. RX_ID mapping cache substitutes the RX_ID from the FCP_XFER_RDY message (in step S305) in data frames so that device 16 gets the RX_ID it is expecting. Due to the substitution, the Fibre Channel write target appears to the source storage device as the destination storage device, and to the destination storage device the Fibre Channel read target appears to be the source storage device In step S310, after device 18 has sent all the data, it sends a FCP_RSP message. This message is again intercepted by Alias cache 27 and routed to software 24 (i.e. IOP 66).

In step S311, switch software 24 sends a LOGO message to both devices 18 and 16, if there are no errors during the Exchange. Switch software 24 also sends a completion message to the user. If there were any errors during the Exchange, then switch software 24 performs error recovery similar to a SCSI initiator.

It is noteworthy that storage devices 18 and 16 are not corrected directly to switch 20. Also, RX_ID mapping cache 26 and alias cache 27 only have to compare the D_ID or S_ID for executing a copy operation.

Figure 2:
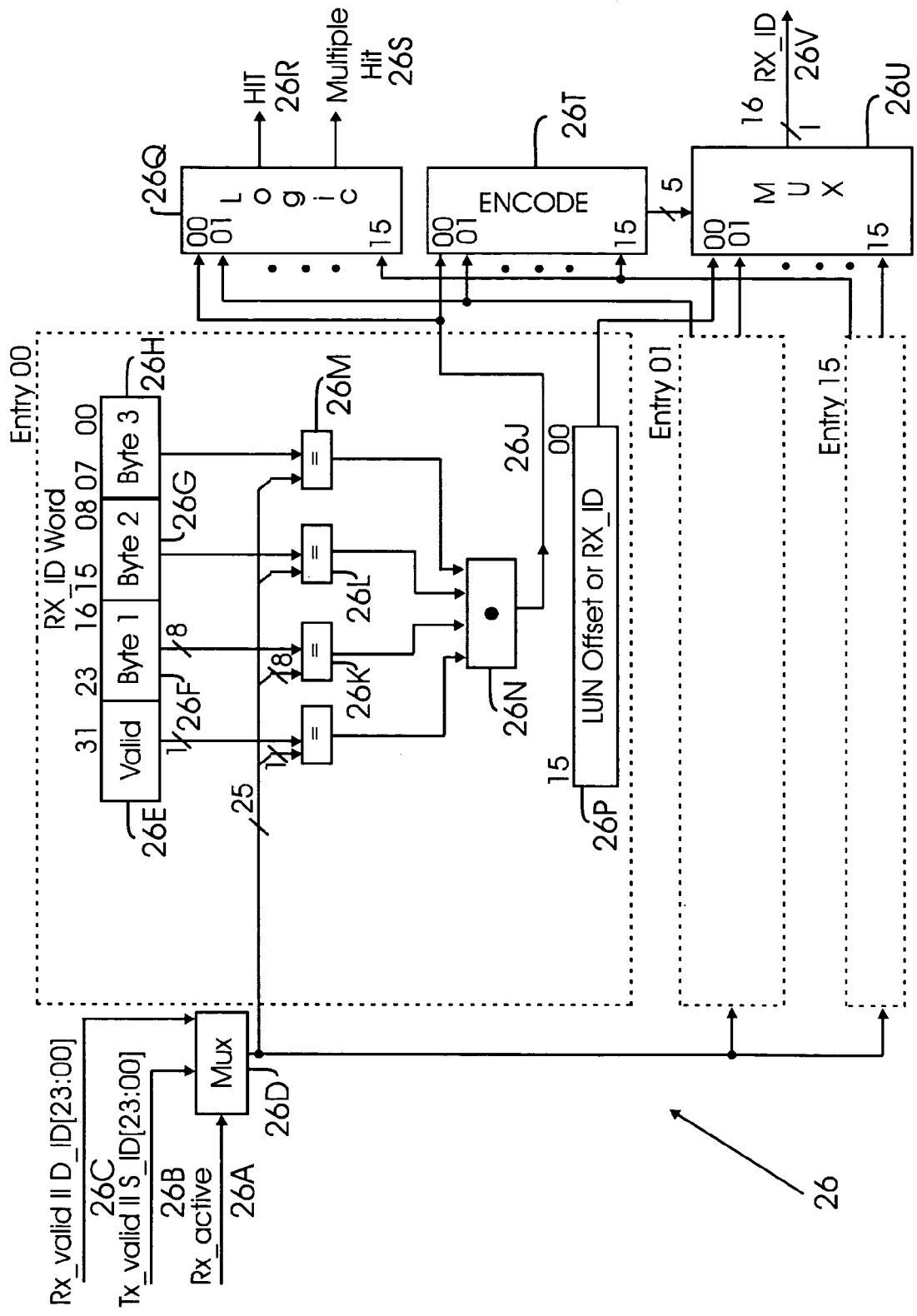
FIG. 2 shows a logic diagram of a RX_ID mapping cache, according to one aspect of the present invention.

RX ID Mapping Cache 26:

RX_ID mapping cache 26 includes plural entries and maps the D_ID for frames received at a port or the S_ID for frames that are being transmitted from the port to a RX_ID. Entries in cache 26 are populated by switch software 24 during the target-to-target copy operation described above with respect to FIG. 3. FIG. 2 shows a detailed logic diagram from RX_ID mapping cache 26 with entries 00 to entry 15 (i.e. 16 entries). Entry 00 includes 26P, a 16-bit value for RX_ID substitution.

It is noteworthy that although various bit values are shown in FIG. 2, the adaptive aspects of the present invention are not limited to any particular bit value.

Cache 26 includes a multiplexer 26D that receives a 24-bit D_ID value 26C for frames that are received and a 24-bit S_ID value 26B for frames that are transmitted from a port (for example, 22). Command/signal 26A is used to enable receive side (i.e. D_ID) comparison. A similar command/signal (not shown) is used for the transmit side.

Incoming frames D_ID or S_ID values are compared by logic 26K, 26L and 26M with entries 26F, 26G and 26H, respectively. A valid bit 26E is set for valid entry. Logic 26N generates a command/signal (output 26J) based on the comparison. Output 26J is sent to logic 26Q that generates a hit signal 26R or a multiple hit signal 26S. If a multiple hit signal 26R is generated, then the lowest entry number may be used and an error status is set and sent to IOP 66.

Output 26J is also sent to an encoder module 26T, whose output is sent to MUX 26U. If hit signal 26R is generated then the RX_ID from the cache entry (26P) is substituted into a frame header RX_ID field. This is shown as 26V in FIG. 2.

Figure 4:
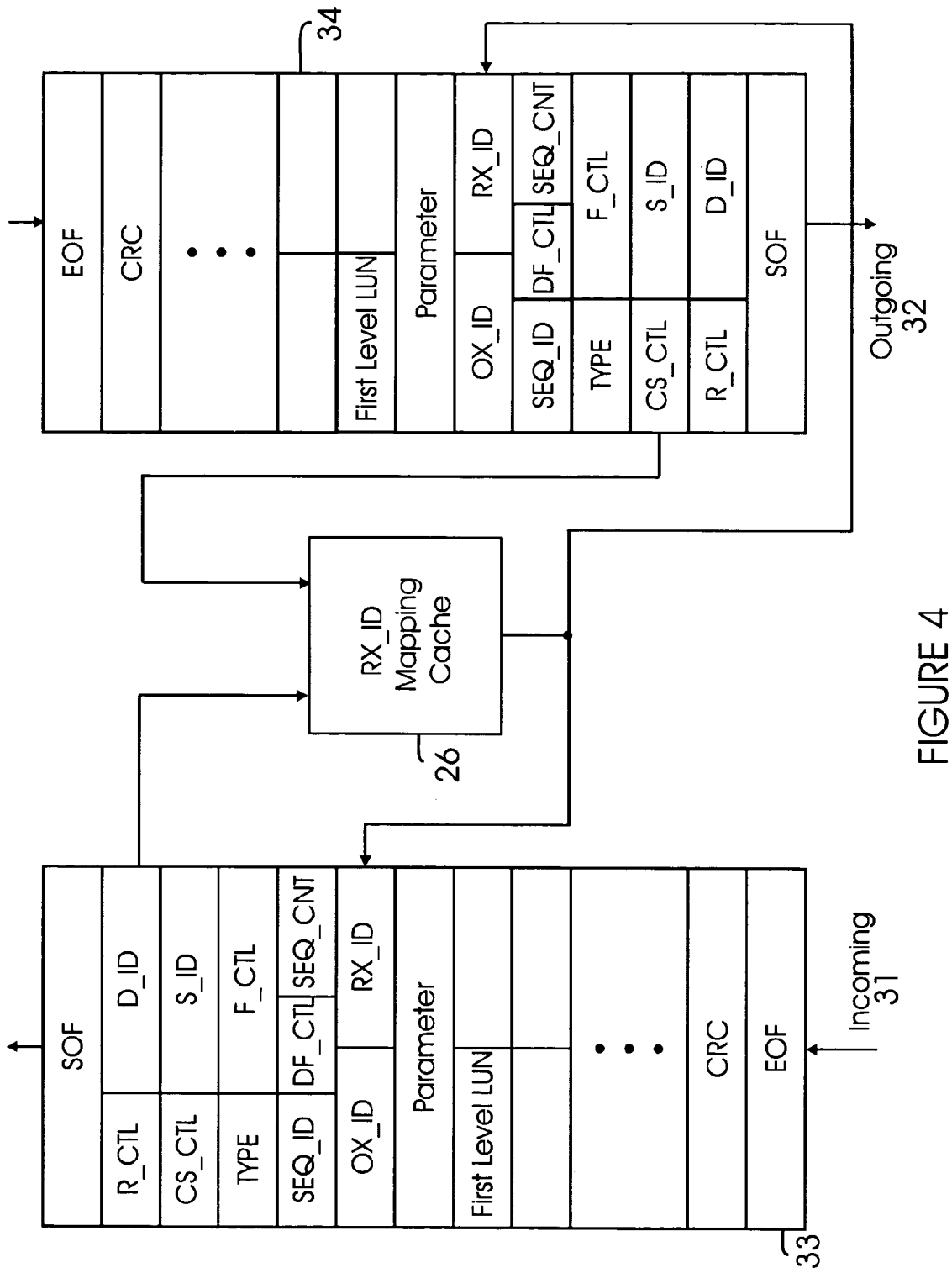
FIG. 4 shows a block diagram for RX_ID substitution, according to one aspect of the present invention.

FIG. 4 shows a block diagram of how RX_ID substitution takes place. A frame 31 enters a port (for example, 22) and the various frame fields are shown in Table 33. An outgoing frame from a port is shown as 32 and the various frame fields are shown in Table 34. The RX_ID substitution has been described above with respect to FIG. 2 and 3.

Cyclic redundancy code ("CRC") is updated for frames with RX_ID substitution. The previous CRC value is checked before the new CRC value is substituted. If a CRC error is detected then the frames end of frame ("EOF") is modified to show an invalid frame.

In one aspect of the present invention, a Fibre Channel switch controls data copying from one storage device to another storage device. This prevents the need for data to be copied from a source storage device to a server, then from the server to a destination device.

Although the present invention has been described with reference to specific embodiments, these embodiments are illustrative only and not limiting. Many other applications and embodiments of the present invention will be apparent in light of this disclosure and the following claims.

What is claimed is:

1. A method for copying data stored at a source storage device to a destination storage device, the source storage device and the destination storage device being operationally coupled to a Fibre Channel switch, comprising:

receiving a copy command via a user interface to copy information from the source storage device to the destination storage device, wherein the Fibre Channel switch receives the copying command;

the Fibre Channel switch logging into the source storage device and the destination storage device, instead of the source storage device and the destination storage device logging into the Fibre Channel switch;

initiating a write operation with the destination target storage device, wherein the Fibre Channel switch (a) initiates the write operation by sending a write command to the destination storage device; (b) sets a source address of the source storage device from where data is to be copied making it appear to the destination storage device as if the source storage device initiated the write operation; and (c) assigns an originator exchange identification field (OX_ID) for an exchange;

receiving a response from the destination storage device; wherein the response includes a destination identifier (D_ID) for the source storage device and the destination storage device sets a responder identification field (RX_ID) for the exchange;

routing the response received from the destination storage device to a switch processor for the Fibre Channel switch, instead of directly sending the response to the source storage device;

initiating a read command with the source storage device, wherein the Fibre Channel switch initiates the read command by setting the destination storage device address as a source address for the read command making it appear to the source storage device that the destination storage device initiated the read command;

routing data directly from the source storage device to the destination source device; and substituting a RX_ID in the response received from the destination storage device with a RX_ID received from the source storage device so that the destination storage device receives an expected RX_ID.

2. The method of claim 1, wherein data is routed directly from the source storage device to the destination storage device without being intercepted by the Fibre Channel switch.

3. The method of claim 1, wherein an alias cache module in the Fibre Channel switch intercepts and routes control frames that are received from the source storage device and the destination storage device.

4. The method of claim 1, wherein a RX_ID mapping cache in he Fibre Channel switch is used for substituting RX_ID values that are received from the source storage device and the destination storage device so that the source storage device and the destination storage device each receive an expected RX_ID.

5. The method of claim 1, wherein cyclic redundancy code is updated for frames with substituted RX_ID and the Fibre Channel switch updates the cyclic redundancy code.

6. The method of claim 1, wherein the Fibre Channel switch performs a N_Port to N_Port, (PLOGI) operation.

7. The method of claim 6, wherein the Fibre Channel Switch performs a process login (PRLI) operation for establishing a small computer systems interface (SCSI) based connection.

8. A method for copying data during a copying operation from a source storage device to a destination storage device, where the source storage device and the destination storage device are operationally coupled to a Fibre Channel switch, comprising:

receiving a user command to copy the data from the source storage device to the destination storage device, wherein the Fibre Channel switch (a) receives the user command; (b) initiates a write operation with the destination storage device and a read operation with the source storage device to copy data from the source storage device to the destination storage device; (c) intercepts messages received from both the source storage device and the destination storage device; (d) substitutes a responder identification field ($RX_{13}$ ID) value received from the destination storage device with a RX_ID value received from the source storage device so that the destination storage device receives an expected RX_ID; and (e) controls the copying operation such that the Fibre Channel switch appears to the source storage device as the destination storage device, and to the destination storage device the Fibre Channel switch appears to be the source storage device.

9. The method of claim 8, wherein the Fibre Channel switch acts as a small computer systems interface (SCSI) initiator and initiates the write operation for the destination storage device and initiates a read operation for the source storage device.

10. The method of claim 8, wherein the Fibre Channel switch includes an alias cache for intercepting the messages between the destination storage device and the source storage device.

11. The method of claim 8, wherein a RX_ID mapping cache for the Fibre Channel switch is used to substitute a RX_ID so that that a Fibre Channel write target appears to the source storage device as the destination storage device, and to the destination storage device a Fibre Channel read target appears to be the source storage device.

12. The method of claim 8, wherein cyclic redundancy code is updated for frames with substituted RX_ID and the Fibre Channel switch updates the cyclic redundancy code.

13. The method of claim 8, wherein the Fibre Channel switch performs a N_Port to N_Port (PLOGI) operation.

14. The method of claim 13, wherein the Fibre Channel Switch performs a process login (PRLI) operation for establishing a small computer systems interface (SCSI) based connection.

15. A storage area network having at least a host computing system, a source storage device and a destination storage device operationally coupled to each other, comprising:

a Fibre Channel switch that receives a user command to copy the data from the source storage device to the destination storage device, wherein the Fibre Channel switch (a) receives the user command; (b) initiates a write operation with the destination storage device and a read operation with the source storage device to copy data from the source storage device to the destination storage device; (c) intercepts messages received from both the source storage device and the destination storage device; (d) substitutes a responder identification field (RX_ID) value received from the destination storage device with a RX_ID value received from the source storage device so that the destination storage device receives an expected RX_ID; and (e) controls the copying operation such that the Fibre Channel switch appears to the source storage device as the destination storage device, and to the destination storage device the Fibre Channel switch appears to be the source storage device.

16. The storage area network of claim 15, wherein the Fibre Channel switch acts as a small computer systems interface (SCSI) initiator and initiates the write operation for the destination storage device and initiates a read operation for the source storage device.

17. The storage area network of claim 15, wherein the Fibre Channel switch includes an alias cache for intercepting the messages between the destination storage device and the source storage device.

18. The storage area network of claim 15, wherein a $RX_{13}$ ID mapping cache for the Fibre Channel switch is used to substitute a RX_ID so that that a Fibre Channel write target appears to the source storage device as the destination storage device, and to the destination storage device a Fibre Channel read target appears to be the source storage device.

19. The storage area network of claim 15, wherein cyclic redundancy code is updated for frames with substitute RX_ID and the Fibre Channel switch updates the cyclic redundancy code.

20. The storage area network of claim 15, wherein the Fibre Channel switch performs a N_Port to N_Pot (PLOGI) operation.

21. The storage area network of claim 20, wherein the Fibre Channel Switch performs a process login (PRLI) operation for establishing a small computer systems interface (SCSI) based connection.

22. A Fibre Channel switch operationally coupled to a host system, a source storage device and a destination storage device, comprising:
a switch software module for the Fibre Channel switch that receives a user command for a copying operation to copy data from the source storage device to the destination storage device, wherein after receiving the user command, the Fibre Channel switch (a) initiates a write operation with the destination storage device and a read operation with the source storage device to copy data from the source storage device to the destination storage device; (b) intercepts messages received from both the source storage device and the destination storage device; (c) substitutes a responder identification field (RX_ID) value received from the destination storage device with a RX_ID value received from the source storage device so that the destination storage device receives an expected RX_ID; (d) controls the copying operation such that the Fibre Channel switch appears to the source storage device as the destination storage device, and to the destination storage device the Fibre Channel switch appears to be the source storage device.

23. The Fibre Channel switch of claim 22, wherein the Fibre Channel switch acts as a SCSI initiator and initiates a write operation for the destination storage device and initiates a read operation for the source storage device.

24. The Fibre Channel switch of claim 22, wherein the Fibre Channel switch acts as a small computer systems interface (SCSI) initiator and initiates the write operation for the destination storage device and initiates a read operation for the source storage device.

25. The Fibre Channel switch of claim 22, wherein a RX_ID mapping cache for the Fibre Channel switch is used to substitute a RX_ID so that that a Fibre Channel write target appears to the source storage device as the destination storage device, and to the destination storage device a Fibre Channel read target appears to be the source storage device.

26. The Fibre Channel switch of claim 22, wherein cyclic redundancy code is updated for frames with substituted RX_ID an the Fibre Channel switch updates the cyclic redundancy code.

27. The Fibre Channel switch of claim 22, wherein the Fibre Channel switch performs a N_Port to N_Port (PLOGI) operation.

28. The Fibre Channel switch of claim 27, wherein the Fibre Channel Switch performs a process login (PRLI) operation for establishing a small computer systems interface (SCSI) based connection.

* * * * *

UNITED STATES PATENT AND TRADEMARK OFFICE
CERTIFICATE OF CORRECTION

PATENT NO. : 7,411,958 B2
APPLICATION NO. : 10/956717
DATED : August 12, 2008
INVENTOR(S) : Frank R. Dropps et al.

Page 1 of 1

It is certified that error appears in the above-identified patent and that said Letters Patent is hereby corrected as shown below:

In column 3, line 44, delete "10 G" and insert -- 10G --, therefor.

In column 6, line 9, delete "10 G" and insert -- 10G --, therefor.

In column 6, line 10, delete "10 G" and insert -- 10G --, therefor.

In column 7, line 65, delete "RX ID" and insert -- RX_ID --, therefor.

In column 8, line 6, delete "26 P," and insert -- 26P, --, therefor.

In column 9, line 34, in claim 4, delete "he" and insert -- the --, therefor.

In column 9, line 62, in claim 8, delete "($RX_{13}$ ID)" and insert -- (RX_ID) --, therefor.

In column 10, line 58-59, in claim 18, delete "$RX_{13}$ ID" and insert -- RX_ID --, therefor.

In column 10, line 65, in claim 18, delete "substitute" and insert -- substituted --, therefor.

In column 11, line 2, in claim 20, delete "N_Pot" and insert -- N_Port --, therefor.

In column 11, line 25, in claim 22, delete "RX_ID;" and insert -- RX_ID; and --, therefor.

In column 12, line 19, in claim 26, delete "an" and insert -- and --, therefor.

Signed and Sealed this

Second Day of November, 2010

David J. Kappos
*Director of the United States Patent and Trademark Office*